United States Patent
Mikiya et al.

(10) Patent No.: US 6,830,070 B2
(45) Date of Patent: Dec. 14, 2004

(54) FLUID COUPLER AUTOMATICALLY UNCOUPLABLE IN AN EMERGENCY

(75) Inventors: Toshio Mikiya, Tokyo (JP); Koji Matsumoto, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 10/621,467

(22) Filed: Jul. 18, 2003

(65) Prior Publication Data
US 2004/0016464 A1 Jan. 29, 2004

(30) Foreign Application Priority Data

Jul. 18, 2002 (JP) ........................................ 2002-209621

(51) Int. Cl.⁷ ............................................... F16L 37/28
(52) U.S. Cl. .......................... 137/614.05; 137/614.02; 251/149.1
(58) Field of Search .......................... 251/149.1, 149.6, 251/149.7; 137/614.02, 614.03, 614.04, 614.05, 614

(56) References Cited

U.S. PATENT DOCUMENTS

| | | | |
|---|---|---|---|
| 2,471,237 A | * 5/1949 | Pasturczak | ............. 137/614.03 |
| 4,240,466 A | 12/1980 | Herzan et al. | |
| 4,485,845 A | 12/1984 | Brady | |
| 4,865,077 A | 9/1989 | Batchen et al. | |

FOREIGN PATENT DOCUMENTS

| | | |
|---|---|---|
| JP | 10-122471 | 5/1998 |
| JP | 10-132180 | 5/1998 |
| JP | 3011824 | 12/1999 |
| JP | 2002-295766 | 10/2002 |
| JP | 2002-295770 | 10/2002 |
| JP | 2003-014186 | 1/2003 |

OTHER PUBLICATIONS

Patent Abstracts of Japan, Publication No. 06–174167, published Jun. 24, 1994 corresponds to Japanese Patent 3011824, abstract.

* cited by examiner

*Primary Examiner*—Kevin Lee
(74) *Attorney, Agent, or Firm*—Wenderoth, Lind & Ponack, L.L.P.

(57) ABSTRACT

A fluid coupler is provided in which a male coupler is brought into a fixed connection condition in which the male coupler is fixedly connected to a female coupler member and retained at a fixed connection position relative to the female coupler member, the fixed connection condition being cancelled or broken when an excessive tension is applied to a fluid line in which the fluid coupler member is installed such that the tension acts on the male and female coupler members to separate them. A first valve is provided between and slidably engaged with the exterior surface of the male coupler member and the interior surface of the female coupler member. The first valve has a through hole having an outer end opening at an outer surface thereof and an inner end opening at the inner surface thereof to fluidly communicate with fluid passages of the male and female coupler members.

16 Claims, 6 Drawing Sheets

FLUID COUPLER AUTOMATICALLY UNCOUPLABLE IN AN EMERGENCY

BACKGROUND OF THE INVENTION

The present invention relates to a fluid coupler comprising male and female coupler members, and more particularly to a fluid coupler adapted to be automatically disassembled or uncoupled in an emergency or in a case where an excessive tension is applied to a fluid line in which the coupler is installed or connected in order to prevent the fluid line from being damaged by the excessive tension.

A representative coupler of this type comprises male and female coupler members each having a spring-biased valve for opening and closing the fluid passage thereof. In use, the male and female coupler members are fixedly connected to each other by a spring-biased connection means with the valves of the male and female coupler members being opened to establish fluid communication between the fluid passages of the male and female coupler members.

When an excessive tension is accidentally applied to a fluid line having the fluid coupler installed therein, the spring biased connection device is disenabled or adversely affected by the excessive tension, whereby the male and female coupler members are disconnected from each other.

This type of coupler involves the following problems: When an excessive tension is applied to the fluid line, the fixed connection between the male and female coupler members established by the spring-biased connection device is cancelled or broken and, simultaneously, the valves of the male and female coupler members are closed. Accordingly, pressurized fluid remains in the fluid passage between the closed valves of the male and female coupler members which have not yet been separated from each other, even though the fixed connection therebetween has been cancelled or broken. The pressurized fluid therefore acts on the male and female coupler members and may abruptly and violently separate them, whereby the separated male coupler member and/or female coupler member may collide against and cause damage to any objects in the area surrounding the coupler, and as a result, become damaged.

Further, since coupler members of a conventional fluid coupler of this type are designed so that they can be connected with each other by simply inserting the male coupler member into the female coupler member after the above-stated separation, the coupler members may be connected and used again in spite of the damage thereto.

SUMMARY OF THE INVENTION

Accordingly, it is an object of the present invention to provide a fluid coupler having structure for preventing male and female coupler members from being abruptly and violently separated from each other by pressure of fluid remaining between valves of the male and female coupler members, which have been closed in response to cancellation of or a break in a fixed connection between the male and female coupler members.

Another object of the present invention is to provide a fluid coupler in which the male and female coupler members are prevented from being coupled by simply inserting the male coupler member into the female coupler member after they are separated from each other by an excessive tension applied to the fluid line in which the fluid coupler is connected.

According to the present invention, there is provided a fluid coupler comprising:

a female coupler member having a first fluid passage and a male coupler member receiving hole having an axis; and, a male coupler member having a second fluid passage, the male coupler member being inserted into the male coupler member receiving hole along the axis of the male coupler member receiving hole so that the male coupler member is brought into a fixed connection condition in which the male coupler member is fixedly connected to the female coupler member and retained at a fixed connection position relative to the female coupler member, with the fixed connection condition being cancelled or broken when an excessive tension is applied to a fluid line in which the fluid coupler member is installed such that tension acts on the male and female coupler members to separate them.

The female coupler member has an interior surface extending in parallel with the axis and defining the male coupler member receiving hole, and the first fluid passage of the female coupler member has an end opening at the interior surface.

The male coupler member has an exterior surface extending in parallel with the axis of the male coupler member receiving hole, and the second fluid passage of the male coupler member has an end opening at the exterior surface of the male coupler member.

The coupler further comprises a first valve movably connected to one of the male and female coupler members and positioned between the exterior surface of the male coupler member inserted into the male coupler member receiving hole, and the interior surface of the female coupler member. The first valve has an outer surface and an inner surface to be slidably engaged with the interior surface and the exterior surface mentioned above, respectively, and, a through hole having an outer end opening at the outer surface and an inner end opening at the inner surface. Under the fixed connection condition, the outer and inner ends of the through hole are aligned with the one end of the first fluid passage and the one end of the second fluid passage, respectively, to effect fluid communication between the first and second fluid passages. Fluid communication between the first and second fluid passages via the through hole is cancelled due to loss of the alignment of the ends of the though hole with respect to at least one of the above-mentioned one ends of the first and second fluid passages, which is caused when the male coupler member is moved in a direction opposite to a direction of insertion of the male coupler member into the female coupler member after cancellation of the fixed connection condition.

BRIEF DESCRIPTION OF THE DRAWINGS

The invention will be better understood from the following detailed description taken in conjunction with the accompanying figures of the drawing, wherein.

DETAILED DESCRIPTION OF THE PREFERRED EMBODIMENT

Figure 1:
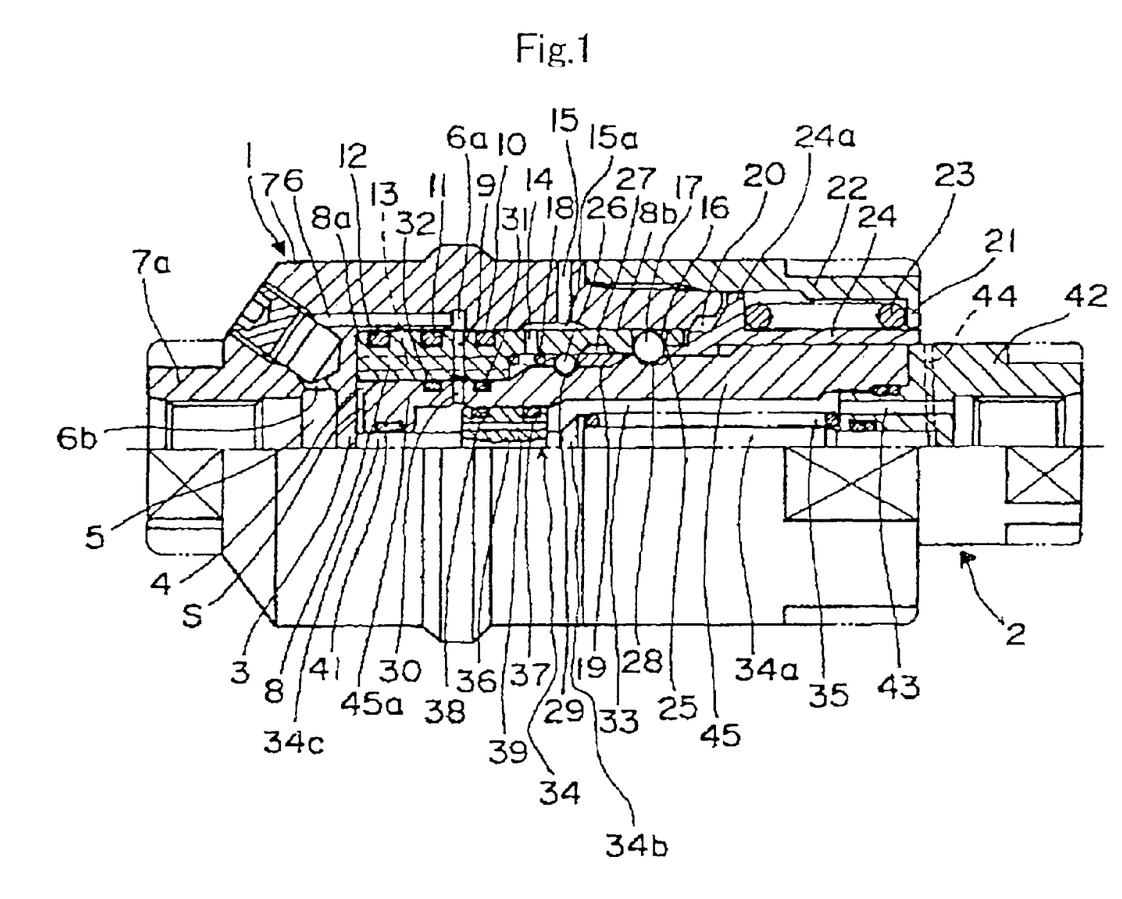
FIG. 1 is a view partially in section showing a fluid coupler in accordance with an embodiment of the present invention in which male and female coupler members thereof are fixedly connected to each other by a spring biased connection means, and valves of the male and female coupler members are opened to establish a fluid communication between fluid passages of the coupler members.
Figure 2:
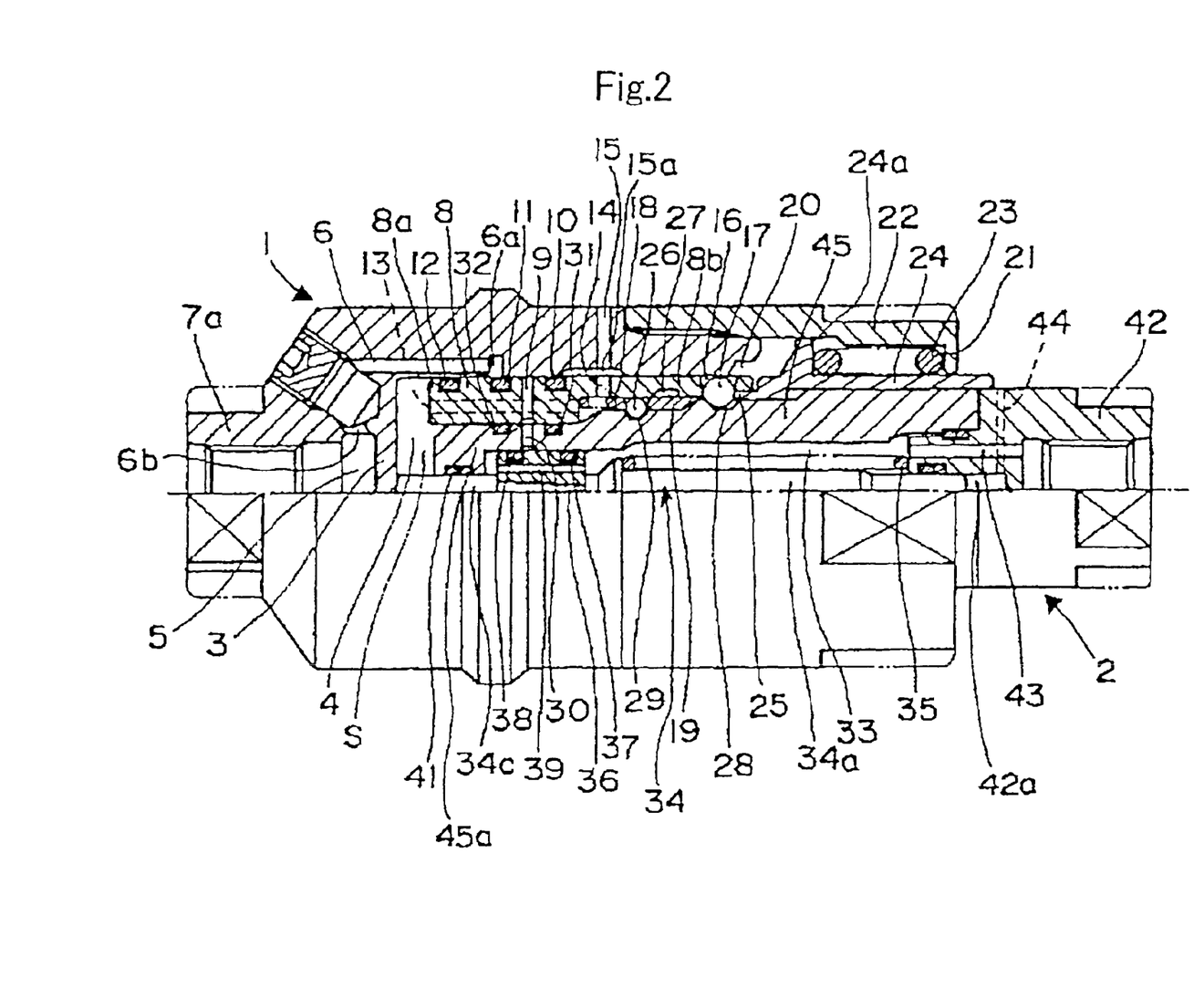
FIG. 2 is a view similar to FIG. 1 showing a state wherein the fixed connection condition between the male and female coupler members has been cancelled or broken by excessive tension applied thereto, and separation of the male and female coupler members has just started.
Figure 3:
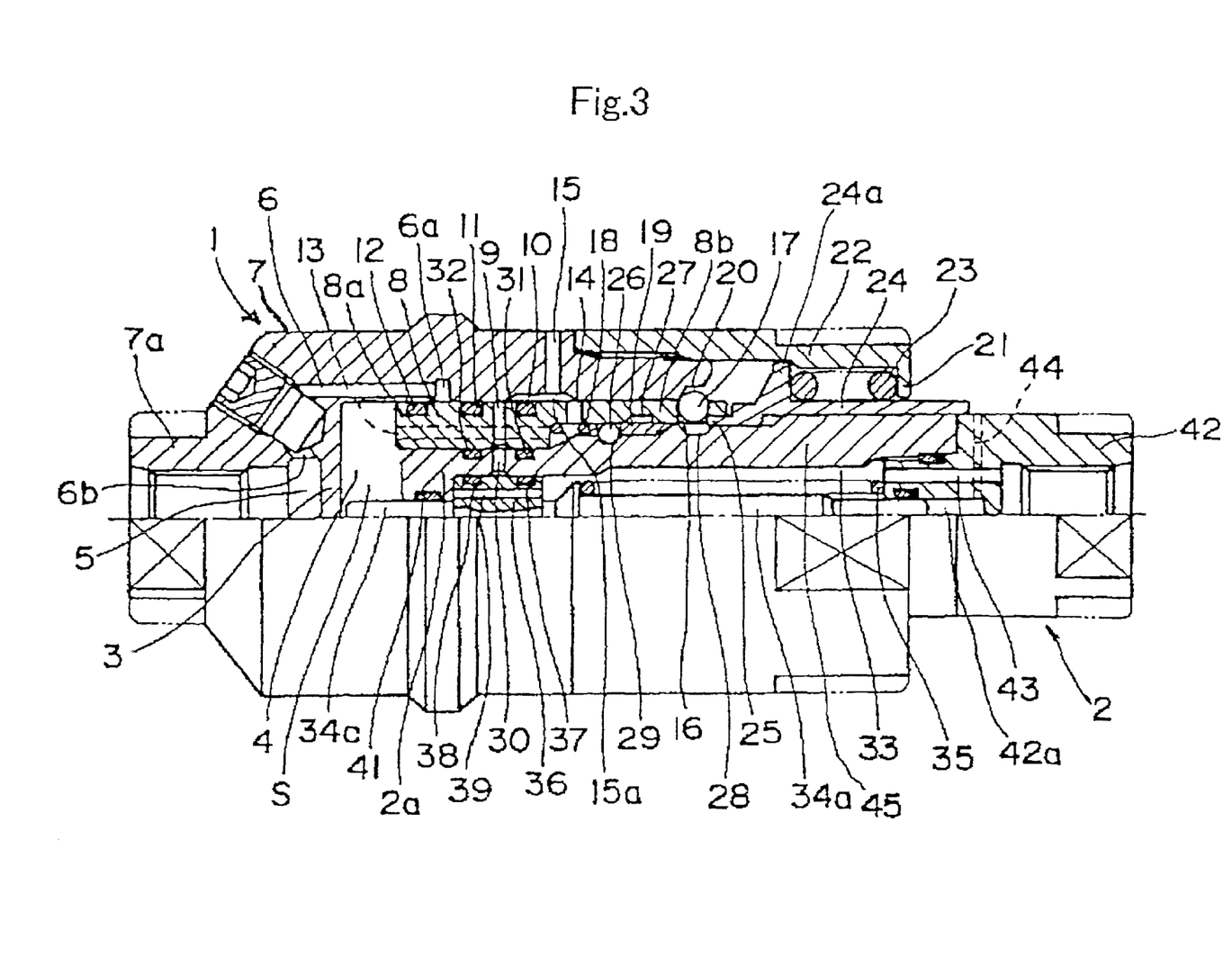
FIG. 3 is a view similar to FIG. 2 showing a state wherein the separation of the male and female coupler members has further proceeded.
Figure 4:
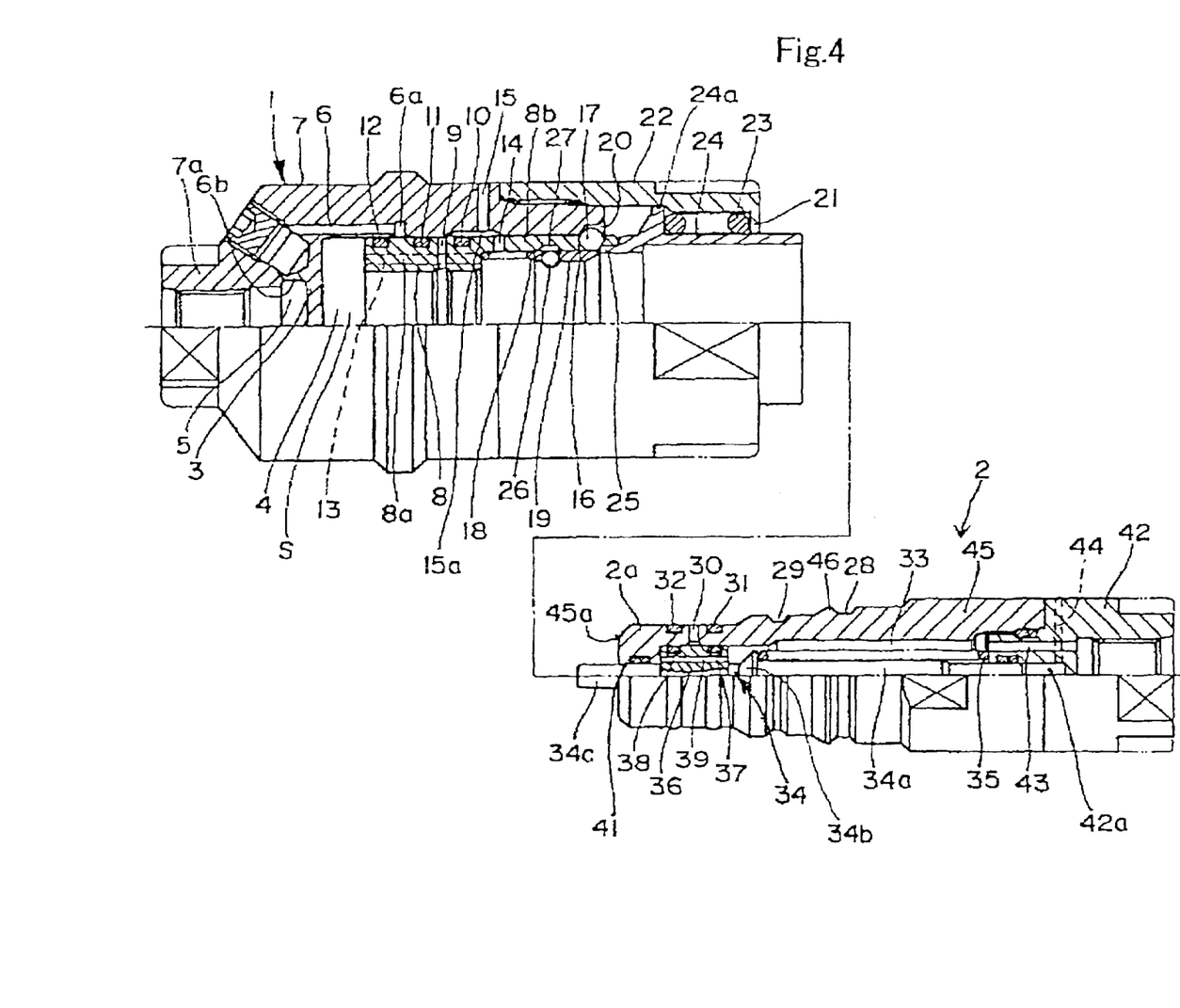
FIG. 4 is a view showing that the male and female coupler members of the fluid coupler have been completely separated from each other.
Figure 5:
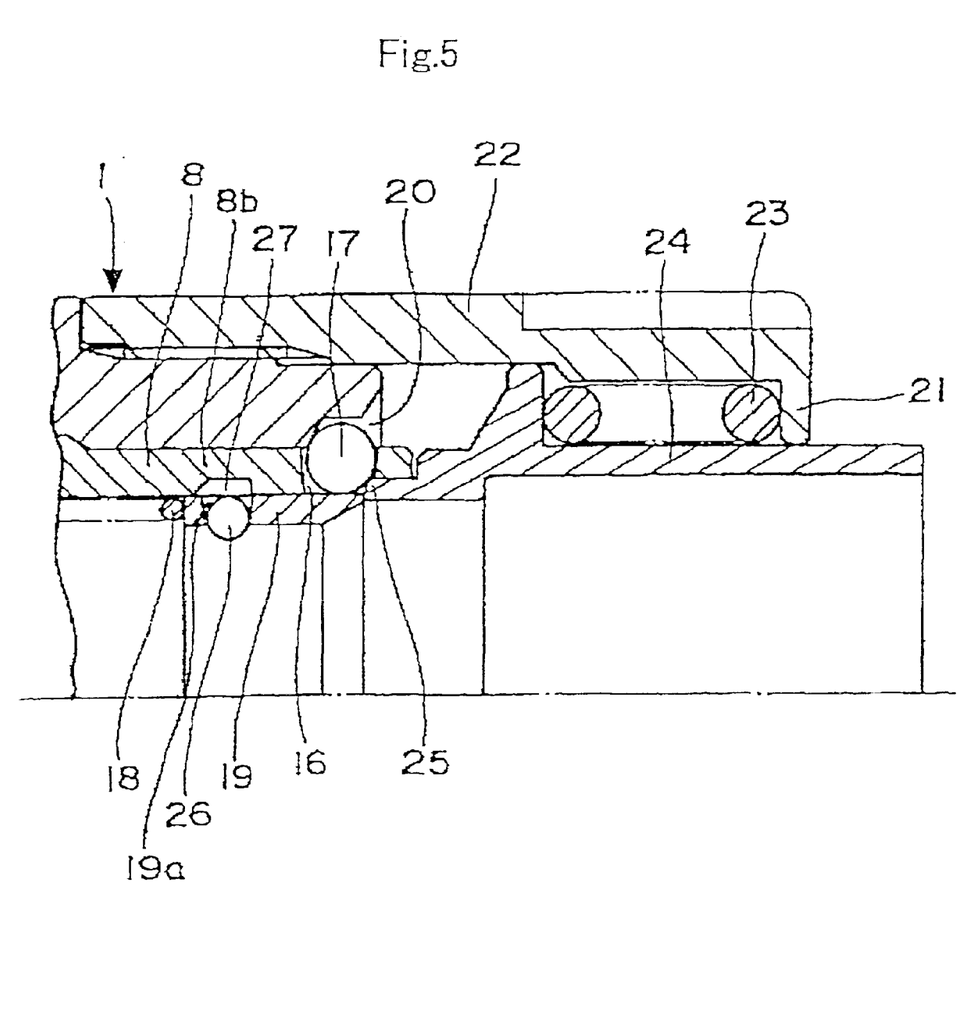
FIG. 5 is an enlarged sectional view of a portion of the female coupler member separated from the male coupler member; and, FIG. 6 shows a state wherein the male and female coupler members, which were separated from each other, are prevented from being brought into contact or recovering a fixed connection condition therebetween as shown in FIG. 1, by simply inserting the male coupler member into the female coupler member.

With reference to FIG. 1, there is shown a coupler in accordance with the present invention. The coupler comprises a female coupler member 1 and a male coupler member 2 (as best shown in FIG. 4). When the coupler is provided as a factory product and used in a fluid line, the female and male coupler members 1 and 2 are, as shown in FIG. 1, assembled and fixedly connected to each other by a spring biased connection means which will be hereinbelow explained in detail. FIGS. 2–4 show various stages of separation of the female and male coupler members 1 and 2 which is caused when an excessive tension is applied to a fluid line having the fluid coupler installed therein.

The female coupler member 1 comprises a tubular body 7 an interior of which is divided by a partition wall 3 into two parts, i.e., a forward interior part 4 and a rearward interior part 5. The tubular body 7 is provided with a fluid passage 6 fluidly connecting the forward interior part 4 with the reward interior part 5. The fluid passage 6 has one end 6a opening at the interior surface of the tubular body 7 defining the forward interior part 4 and the other end 6b opening at the interior surface of the tubular body 7 defining the reward interior part 5. The rear end portion 7a of the tubular body 7 is designed as a fitting for connection of, for example, a fluid supply side hose or conduit (not shown).

The female coupler member 1 comprises a tubular valve 8 coaxially provided in and slidably engaged with the forward interior part 4 of the tubular body 7 in such a manner that the valve 8 is movable in a direction of an axis of the forward interior part 4. The tubular valve 8 has outer and inner cylindrical surfaces. The outer surface of the valve 8 has a diameter which is uniform along the entire axial length of the tubular valve 8. The inner surface of the valve 8 has a small diameter portion in a rear portion 8a of the valve and a large diameter portion of a forward portion 8b of the valve. The tubular valve 8 has a fluid path 9 radially extending through the rear portion 8a of the tubular valve 8. When the tubular valve 8 is at a rearward position shown in FIG. 1, the fluid path 9 is radially aligned with the end 6a of the fluid passage 6 of the female coupler member 1 to fluidly connect the fluid path 9 with the fluid passage 6. When the valve 8 is moved forwardly from the rear position, the fluid path 9 is, as shown in FIGS. 2–4, not aligned with the opening end 6a to shut out the fluid connection between the fluid passage 6 and the fluid path 9.

The rear portion 8a of the tubular valve 8 is provided on its outer surface with sealing rings 10, 11 and 12 sealingly engaged with the interior surface of the tubular body 7 of the female coupler member 1. When the tubular valve 8 is at the rearward position shown in FIG. 1, the sealing rings 10 and 11 are positioned on the opposite sides of the fluid passage opening end 6a radially aligned with the fluid path 9 of the tubular valve 8; when the tubular valve 8 is at the forward position as shown in FIG. 4, the sealing rings 11 and 12 are positioned on opposite sides of the fluid passage opening end 6a.

The rear portion 8a of the tubular valve 8 is further provided with a horizontal vent port 13 extending therethrough in such a manner that the vent port 13 does not intersect the fluid path 9. The forward portion 8b of the tubular valve also has a radial vent port 14 radially extending therethrough. The tubular body 7 of the female coupler member 1 is provided with a vent port 15 radially extending therethrough and in constant fluid communication with the vent port 14 via a wide width annular groove 15a formed in the interior surface of the tubular body 7 of the female coupler member 1.

The tubular valve 8 further has a plurality of radial holes 16 which are positioned adjacent to the forward end thereof and spaced away from each other in a circumferential direction. The radial through holes 16 each receive a locking ball 17 movable in a radial direction. The tubular valve 8 is also provided with a ball support sleeve 19 which is slidably engaged with the inner surface of the tubular valve 8 and urged by a compression spring 18 towards a position shown in FIG. 4 wherein the sleeve 19 supports the locking balls 17 to prevent the locking ball from falling into an interior of the tubular valve 8. In this position, a radially outward portion, in terms of the female coupler 1, of the locking balls 17 is received in an annular recess 20 formed at the forward end of the tubular body 7 of the female coupler member 7.

As shown in FIG. 1, when the male coupler member 2 is fixedly connected to the female coupler member 1 and, thus, the tubular valve 8 is at the rear position, the locking balls 17 is received in an annular groove 28 formed in the outer surface of the male coupler member 2, which will hereinbelow be explained in detail, and engaged by the interior surface of the tubular body 7 of the female coupler member 1.

The female coupler member 1 has a tubular member 22 which is threadably engaged with the forward end of the tubular body 7 of the female coupler member 1. Further, the female coupler member 1 has a valve urging tubular member 24 positioned inside the tubular member 22 and having an outer annular flange 24a (FIG. 4). The valve urging tubular member 24 is urged rearwardly or towards the tubular valve 8 by a compression spring 23 positioned between the flange 24a thereof and a forward end flange 21 of the tubular member 22. The valve urging tubular member 24 has a rear end 25 abuttingly engaged with the locking balls 17, so that the valve urging tubular member 24 transmits an urging force of the compression spring 23 to the tubular valve 8 through the locking balls 17 to urge the valve 8 towards its rear position shown in FIG. 1. It will be appreciated that in a condition wherein the female and male coupler members 1 and 2 are assembled as shown in FIG. 1, the urging force of the compression spring 23 is also transmitted to the male coupler member 2 to fixedly connect the male coupler member 2 to the female coupler member 1.

The ball support sleeve 19 includes at least one radial through hole 19a which receives a second locking ball 26. The hole 19a is radially inwardly tapered to prevent the locking ball 26 from falling into the inside of the sleeve 19, while allowing a portion of the second locking ball 26 to extend radially inwardly from the radially inner surface of the sleeve 19.

The male coupler member 2 has a tubular body 45 and a tubular fitting 42 connected to the rear end of the tubular body 45 for connection of, for example, a fluid receiving-side pipe or conduit (not shown). The tubular body 45 is provided on its outer cylindrical surface with a first annular groove 28 for receiving the locking balls 17 and a second annular groove 29 for receiving the second locking ball 26. The tubular body 45 has a small diameter forward end portion 45*a* adapted to be inserted into the rear portion 8*a* of the tubular valve 8. The small diameter forward end portion 45*a* is provided with a radial through hole 30. The radial through hole 30 is adapted to be radially aligned with the radial fluid path 9 formed in the tubular valve 8 when the male coupler member 2 is, as shown in FIG. 1, under the fixed connection condition with respect to the female coupler member 1. The forward end portion 45*a* is provided on its outer surface with a pair of sealing rings 31, 32 positioned on the opposite sides of the radial through hole 30 to be sealingly engaged with the inner surface of the rearward portion 8*a* of the tubular valve 8.

The tubular body 45 of the male coupler member 2 further includes a fluid passage 33 axially extending from a rear end face of the tubular body 45 to the inside of the small diameter forward end portion 45*a*, a valve member 34 received in the fluid passage 33 and a compression spring 35 urging the valve member 34 towards a forward end of the tubular body 45 of the male coupler member 2. The valve member 34 comprises a cylindrical valve body 36 engaged with and axially slidable relative to the side wall surface of the fluid passage 33 inside the forward end portion 45*a* of the male coupler member 2. The cylindrical valve body 36 of the valve member 34 is provided with a plurality of axial fluid paths 39 extending therethrough and a pair of sealing rings 37, 38 on its outer cylindrical surface sealingly engaged with a side wall surface of the fluid passage 33. The cylindrical valve body 36 of the valve member 34 is movable in the fluid passage 33 between a forward position as shown in FIG. 4, in which the cylindrical valve body 36 closes the radially inner end of the radial through hole 30 formed in the small diameter forward end portion 45*a* of the tubular body 45, and a rearward position as shown in FIG. 1 in which the cylindrical valve body 36 opens the radially inner end of the radial through hole 30.

In the embodiment illustrated in the figures, the valve member 34 has a valve stem 34*a* fixed thereto and axially extending through the cylindrical valve body 36. The valve stem 34*a* has a rearward portion extending from the rear side of the cylindrical valve body 36 with the rear end thereof being slidably received in a horizontal hole 42*a* formed in the fitting 42 and a forward portion extending forwardly from the front side of the cylindrical valve body 36. The forward portion 34*c* of the valve stem slidably passes through a horizontal through hole 41 formed in the forward end wall of the male coupler member 2. The rearward portion of the stem 34*a* is provided with an annular flange 34*b*. A compression spring 35 is mounted around the rear portion of the stem 34*a* between the fitting 42 and the annular flange 34*b* to urge the valve to the forward position thereof as shown in FIG. 4. In an assembled condition of the female and male coupler members 1 and 2 as shown in FIG. 1, the forward end of the stem 34*a* is abuttingly engaged with the partition wall 3 of the female coupler member to thereby shift the valve member 34 to its rearward position.

The fitting 42 is formed with a plurality of horizontal fluid paths extending horizontally therethrough and a radial vent hole 44 extending from the horizontal hole 42*a* radially outwardly and opening at the outer surface of the fitting.

As stated above, the coupler in accordance with the embodiment of the present invention is provided as a factory product such that the male coupler member 2 and the female coupler member 1 are assembled as shown in FIG. 4. When these coupler members 1 and 2 are assembled, the female coupler member 1 is provided with the tubular member 22, the valve urging tubular member 24 and the compression spring 23 to be removed therefrom. The valve urging tubular member 24 is mounted on the male coupler member 2 in a manner similar to that shown in FIGS. 1–3. The male coupler member 2 with the valve urging tubular member 24 is then inserted into the female coupling member 1. As the male coupler member is moved forwardly, the lock ball support sleeve 19 is engaged and moved forwardly by the male coupler member 2. During such forward movement of the male coupler member, the first locking balls 17 and the second locking ball 26 are received in the annular grooves 28 and 29 of the male coupler member 2, respectively, to thereby enable these balls to be moved together with the male coupler member 2 forwardly. Meanwhile, the compression spring 23 and the tubular member 22 are placed around the male coupler member 2 with the valve urging tubular member 24 and, then, the tubular member 22 is threadably engaged with the tubular body 7 of the female coupler member 2 to eventually bring the female and male coupler members 1 and 2 into a condition as shown in FIG. 1 where the female and male coupler members 1 and 2 are assembled or coupled to each other with the valves 8 and the valve member 34 being opened to establish the fluid communication between the fluid passages 6 and the fluid passage 33 thereof. In use, a fluid supply conduit is connected to the fitting part 7*a* of the tubular body 7 of the female coupler member 1 and a fluid receiving conduit is connected to the fitting 42 of the male coupler member 2.

If an excessive tension is accidentally applied to the fluid line having the fluid coupler installed therein under the condition as shown in FIG. 1, the male coupler member 2 is moved rightwards or rearwards relative to the female coupler member 1 with the compression spring 23 being compressed or shortened. As the male coupler member 2 moves, the tubular valve member 8 accompanies it. During the movement of the male coupler member 2 and the tubular valve 8, radial alignment between the radial fluid paths 9 and 30 thereof and the fluid passage 6 of the female coupler member 1 is first cancelled (see FIG. 2). Simultaneously, the end 6*a* of the fluid passage 6 of the female coupler member 1 is closed by a cylindrical outer surface of the tubular valve member 8 and the radially inner end of the fluid path 30 is also closed by an outer surface of the cylindrical valve body 36 of the valve member 34 which is retained at an initial position by the force of the spring 35. Accordingly, although the paths 9 and 30 are filled with the remaining fluid, since the interior surface of the female coupler member 1 and the outer surface of the cylindrical valve body 36 are parallel to the axis of the coupler, the pressure of the fluid remaining in the fluid paths 9 and 30 has no pressure component acting on the female coupler member 1 and/or male coupler member 2 in the axial direction.

As the movement of the male coupler member 2 and the tubular valve 8 proceeds, the locking balls 17 are brought into a position where the locking balls 17 are radially aligned with the annular recess 20 formed in the forward end of the tubular body 7 of the female coupler member 1. Therefore, as the male coupler member 2 further moves, the locking balls 17 are displaced into the annular recess 20 thereby enabling the male coupler member 2 to move alone, leaving the tubular valve 8 and the valve urging tubular member 24 at the position shown in FIG. 3. At this stage, the locking ball support sleeve 19 still moves together with the male coupler member 2. When the locking ball support sleeve 19 comes to a position as shown in FIG. 4 wherein the forward end thereof supports the locking balls 17 and the second locking ball 26 is radially aligned with the annular groove 27 formed in the tubular valve 8, the male coupler member 1 continues in movement and displaces the second locking ball 26 towards the annular groove 27, thereby leaving the locking ball support sleeve 19 at the position shown in FIG. 4 and, eventually separates from the female coupler member 1.

During the movement of the male coupler member 2 as stated above, the space formed between the partition wall 3 of the female coupler member 1 and the forward end of the male coupler member 2 and the forward end of the tubular valve 8 is in constant fluid communication with the atmosphere via the vent holes 13, 14 and 15 to avoid generation of a negative pressure in the space. During a latter part of the movement of the male coupler member 2, the valve member 34 is engaged by and moved by the male coupler member 2 and, thus, the rear end of the valve stem 34a is moved into the horizontal hole 42a in the fitting 42 of the male coupler member 2. During such movement of the stem 34a, the vent hole 44 avoids generation of a positive pressure in the horizontal hole 42a to facilitate the movement of the stem.

Figure 6:
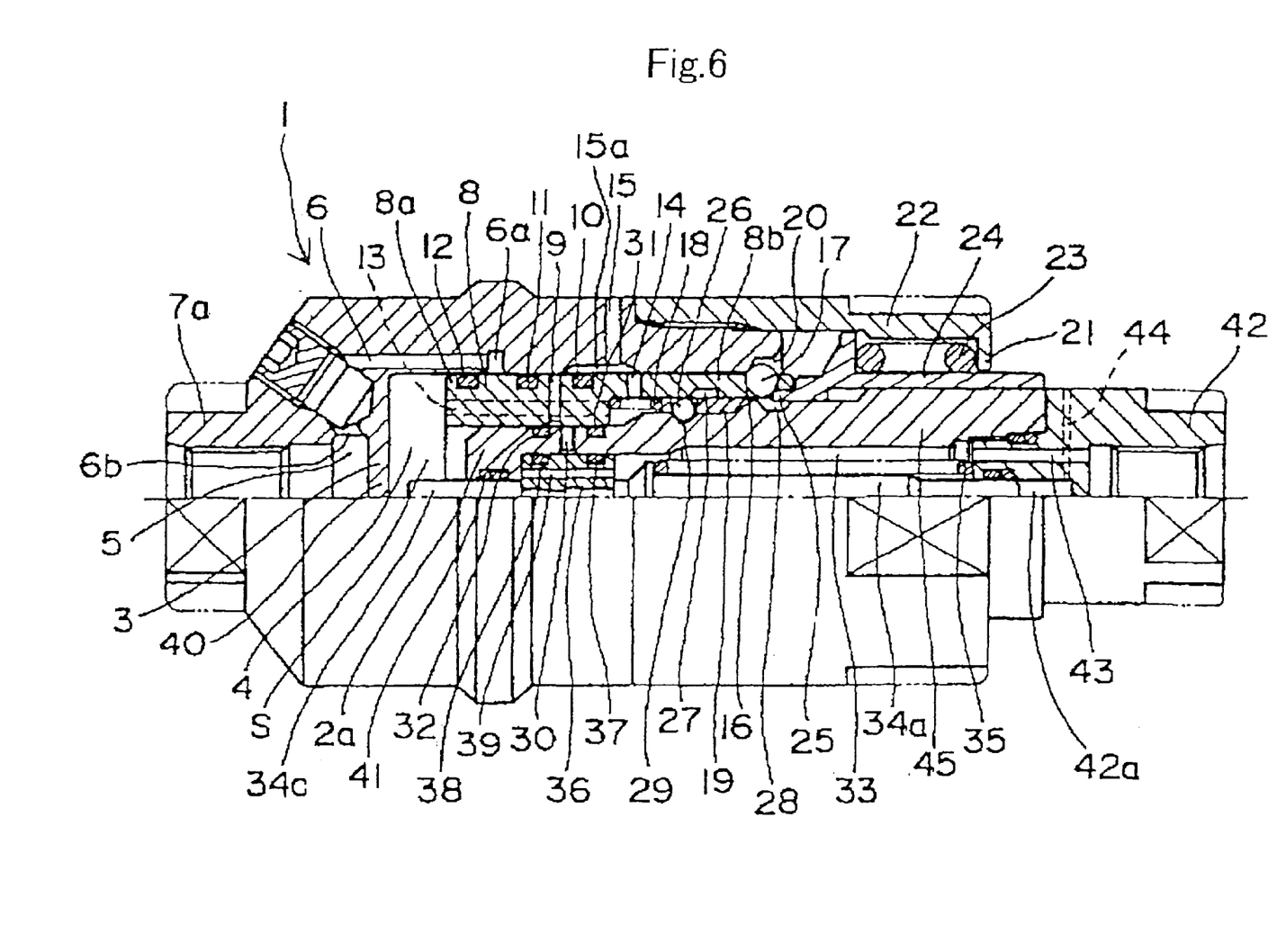

If assembling of the male and female coupler members is attempted after the separation thereof, the locking ball support sleeve is moved rearwards or leftwards by the male coupler member 2 inserted into the female coupler member 1; however, as shown in FIG. 6, the locking balls 17 are engaged by the rear end 25 of the valve urging tubular member 24 and thus cannot enter the annular recess 28 of the male coupler member 2. As a result, the attempt to assemble the male and female coupler members fails.

Although the present invention has been described in terms of a specific embodiment, it is anticipated that variations and modifications thereof will no doubt become apparent to those skilled in the art. It is therefore intended that the following claims be interpreted as covering all such variations and modifications as fall within the true spirit and scope of the invention.

What is claimed is:

1. A fluid coupler comprising:
   a female coupler member having
      (i) an interior surface defining a male coupler member receiving hole having an axis, and
      (ii) a first fluid passage having an end opening at said interior surface;
   a male coupler member having
      (i) an exterior surface, and
      (ii) a second fluid passage having an end opening at said exterior surface,
      said male coupler member being insertable into said male coupler member receiving hole along said axis such that said exterior surface extends parallel to said axis and so as to bring said male coupler member into a fixed connection condition in which said male coupler member is fixedly connected to said female coupler member and retained at a fixed connection position relative to said female coupler member, with the fixed connection condition being designed to be canceled or broken, when an excessive tension is applied to a fluid line in which the fluid coupler is installed, via tension acting on said female and male coupler members that causes said female and male coupler members to separate from one another;
   a spring member for applying a force to said male coupler member, after being inserted within said male coupler receiving hole, so as to hold said male coupler member at the fixed connection position; and
   a first valve mounted on said interior surface and positioned between said exterior surface and said interior surface when said male coupler member is inserted within said male coupler member receiving hole, said first valve having an outer surface and an inner surface to be slidably engaged with said interior surface and said exterior surface, respectively, when said male coupler member is inserted within said male coupler member receiving hole, said first valve also having a through hole having an outer end opening at said outer surface and an inner end opening at said inner surface,
   such that when said male coupler is in the fixed connection condition, said outer end of said through hole and said inner end of said through hole are aligned with said end of said first fluid passage and said end of said second fluid passage, respectively, so as to effect fluid communication between said first fluid passage and said second fluid passage, which fluid communication is to be canceled due to loss of at least one of alignment of said outer end of said through hole relative to said end of said first fluid passage and alignment of said inner end of said through hole relative to said end of said second fluid passage, which loss is caused when said male coupler member is moved in a direction opposite to a direction of insertion of said male coupler member into said male coupler receiving hole, corresponding to cancellation of the fixed connection condition.

2. The fluid coupler according to claim 1, wherein
   said second fluid passage comprises an axially extending portion, and a radially extending portion extending from said axially extending portion to said end of said second fluid passage, and
   said male coupler member includes a second valve slidably received in said axially extending portion, said second valve for effecting a fluid connection between said radially extending portion and said axially extending portion when said male coupler member is in the fixed connection condition, and for preventing fluid connection between said radially extending portion and said axially extending portion when said male coupler member is moved in the direction opposite to the direction of insertion of said male coupler member into said male coupler receiving hole.

3. The fluid coupler according to claim 2, wherein
   said interior surface is circular in cross section and concentric with said axis,
   said exterior surface is circular in cross section and concentric with said axis when said male coupler member is in the fixed connection condition, and
   said first valve is cylindrical and circular in cross section.

4. The fluid coupler according to claim 3, further comprising:
   a first locking member that is
      (i) engageable with said first valve and said male coupler member so as to prevent relative movement between said first valve and said male coupler member, and
      (ii) radially displaceable outwardly by said male coupler member, upon movement of said male coupler member from the fixed connection position in the direction opposite to the direction of insertion of said male coupler member into said male coupler receiving hole, so as to engage with said first valve and said female coupler member after said first valve and said male coupler member have moved a predetermined distance from the fixed connection position in the direction opposite to the direction of insertion of said male coupler member into said male coupler receiving hole, such that said first valve is prevented from continuing to move in the direction opposite to the direction of insertion of said male coupler member into said male coupler receiving hole and said male coupler member is allowed to continue to move in the direction opposite to the direction of insertion of said male coupler member into said male coupler receiving hole.

5. The fluid coupler according to claim 1, wherein said interior surface is circular in cross section and concentric with said axis, said exterior surface is circular in cross section and concentric with said axis when said male coupler member is in the fixed connection condition, and said first valve is cylindrical and circular in cross section.

6. The fluid coupler according to claim 5, further comprising:

a first locking member that is
(i) engageable with said first valve and said male coupler member so as to prevent relative movement between said first valve and said male coupler member, and
(ii) radially displaceable outwardly by said male coupler member, upon movement of said male coupler member from the fixed connection position in the direction opposite to the direction of insertion of said male coupler member into said male coupler receiving hole, so as to engage with said first valve and said female coupler member after said first valve and said male coupler member have moved a predetermined distance from the fixed connection position in the direction opposite to the direction of insertion of said male coupler member into said male coupler receiving hole, such that said first valve is prevented from continuing to move in the direction opposite to the direction of insertion of said male coupler member into said male coupler receiving hole and said male coupler member is allowed to continue to move in the direction opposite to the direction of insertion of said male coupler member into said male coupler receiving hole.

7. The fluid coupler according to claim 1, further comprising:

a first locking member that is
(i) engageable with said first valve and said male coupler member so as to prevent relative movement between said first valve and said male coupler member, and
(ii) radially displaceable outwardly by said male coupler member, upon movement of said male coupler member from the fixed connection position in the direction opposite to the direction of insertion of said male coupler member into said male coupler receiving hole, so as to engage with said first valve and said female coupler member after said first valve and said male coupler member have moved a predetermined distance from the fixed connection position in the direction opposite to the direction of insertion of said male coupler member into said male coupler receiving hole, such that said first valve is prevented from continuing to move in the direction opposite to the direction of insertion of said male coupler member into said male coupler receiving hole and said male coupler member is allowed to continue to move in the direction opposite to the direction of insertion of said male coupler member into said male coupler receiving hole.

8. The fluid coupler according to claim 7, further comprising:

a locking member retaining member for engaging said first locking member, such that after said first locking member has been displaced radially outwardly by said male coupler member said locking member retaining member prevents said first locking member from moving radially inwardly.

9. The fluid coupler according to claim 8, further comprising:

a spring member for urging said locking member retaining member in the direction opposite to the direction of insertion of said male coupler member into said male coupler receiving hole, wherein said locking member retaining member is movable in the direction opposite to the direction of insertion of said male coupler member into said male coupler receiving hole such that when said first locking member is engaged with both said first valve and said male coupler member said locking member retaining member urges said male coupler member and said first valve in the direction opposite to the direction of insertion of said male coupler member into said male coupler receiving hole.

10. The fluid coupler according to claim 9, wherein said locking member retaining member is positioned between said first valve and said male coupler member when said male coupler member is inserted within said male coupler receiving hole, and is movable relative to said first valve and said male coupler member in a direction parallel to said axis, said fluid coupler further comprising:

a second locking member engageable with said locking member retaining member and said male coupler member to enable said locking member retaining member and said male coupler member to move together in a direction parallel to said axis, and also engageable with said locking member retaining member and said first valve to enable said male coupler member to move relative to said locking member retaining member, such that (i) with said second locking member engaged with said locking member retaining member and said male coupler member, upon movement of said male coupler member from the fixed connection position in the direction opposite to the direction of insertion of said male coupler member into said male coupler receiving hole said locking member retaining member is moved together with said male coupler member and brought into a position, radially inwardly of said first locking member, at which said locking member retaining member engages said first locking member and prevents said first locking member from moving radially inwardly after said male coupler member has passed said first locking member and displaced said first locking member radially outwardly, and (ii) when said locking member retaining member is brought into the position radially inwardly of said first locking member, said second locking member is permitted to be displaced radially outwardly by said male coupler member, upon movement of said male coupler member in the direction opposite to the direction of insertion of said male coupler member into said male coupler receiving hole, so as to enable said second locking member to be engaged by both said locking member support member and said first valve to thereby prevent said locking member retaining member from moving together with said male coupler member while said male coupler member continues to move in the direction opposite to the direction of insertion of said male coupler member into said male coupler receiving hole.

11. The fluid coupler according to claim 2, further comprising:
a first locking member that is
(i) engageable with said first valve and said male coupler member so as to prevent relative movement between said first valve and said male coupler member, and
(ii) radially displaceable outwardly by said male coupler member, upon movement of said male coupler member from the fixed connection position in the direction opposite to the direction of insertion of said male coupler member into said male coupler receiving hole, so as to engage with said first valve and said female coupler member after said first valve and said male coupler member have moved a predetermined distance from the fixed connection position in the direction opposite to the direction of insertion of said male coupler member into said male coupler receiving hole, such that said first valve is prevented from continuing to move in the direction opposite to the direction of insertion of said male coupler member into said male coupler receiving hole and said male coupler member is allowed to continue to move in the direction opposite to the direction of insertion of said male coupler member into said male coupler receiving hole.

12. A fluid coupler comprising:
a tubular female coupler member having
(i) a forward end, a rearward end, and a partition wall between said forward and rearward ends,
(ii) an interior surface defining a male coupler member receiving hole having an axis, said interior surface being circular in cross section and concentric with said axis, said male coupler member receiving hole extending from said forward end towards said rearward end and terminating at said partition wall, and
(iii) a first fluid passage including a first portion extending from said rearward end and terminating at said partition wall, and also including a second portion extending from said first portion, to radially outwardly of said partition wall, and reaching and opening at said interior surface,
a male coupler member having
(i) a forward end and a rearward end,
(ii) an exterior surface, said exterior surface being circular in cross section and concentric with said axis when said male coupler member is within said male coupler member receiving hole, and
(iii) a second fluid passage having an end opening at said exterior surface, said second fluid passage including an axially extending portion extending from said rearward end of said male coupler member towards said forward end of said male coupler member, and also including a radially extending portion extending from said axially extending portion to said end of said second fluid passage, said male coupler member being insertable into said male coupler member receiving hole along said axis such that said exterior surface extends parallel to said axis and so as to bring said male coupler member into a fixed connection condition in which said male coupler member is fixedly connected to said female coupler member and retained at a fixed connection position relative to said female coupler member, with the fixed connection condition being designed to be canceled or broken, when an excessive tension is applied to a fluid line in which the fluid coupler is installed, via tension acting on said female and male coupler members that causes said female and male coupler members to separate from one another;

a circular tubular first valve positioned between said exterior surface and said interior surface when said male coupler member is inserted within said male coupler member receiving hole, said first valve having an outer surface and an inner surface to be slidably engaged with said interior surface and said exterior surface, respectively, when said male coupler member is inserted within said male coupler member receiving hole, said first valve also having a through hole having an outer end opening at said outer surface and an inner end opening at said inner surface;

a second valve slidably received in said axially extending portion of said second fluid passage, said second valve having a stem extending through said forward end of said male coupler member; and a valve spring for urging said second valve towards said forward end of said male coupler member, such that when said male coupler is in the fixed connection condition,
(i) said outer end of said through hole and said inner end of said through hole are aligned with said end of said first fluid passage and said end of said second fluid passage, respectively, so as to effect fluid communication between said first fluid passage and said second fluid passage, which fluid communication is to be canceled due to loss of at least one of alignment of said outer end of said through hole relative to said end of said first fluid passage and alignment of said inner end of said through hole relative to said end of said second fluid passage, which loss is caused when said male coupler member is moved in a direction opposite to a direction of insertion of said male coupler member into said male coupler receiving hole, corresponding to cancellation of the fixed connection condition, and
(ii) said stem is abuttingly engaged with said partition wall, whereby said second valve is shifted relative to said male coupler member towards said rearward end of said male coupler member and said valve spring is compressed, to thereby allow said axially extending portion and said radially extending portion of said second fluid passage to be fluidly interconnected, and wherein said valve spring is for maintaining said second valve in a condition such that said stem is engaged with said partition wall until said male coupler member engages and moves said second valve in the direction opposite to the direction of insertion of said male coupler member into said male coupler receiving hole, after said male coupler member moves from the fixed connection condition, so that said second valve blocks fluid communication between said axially extending portion and said radially extending portion of said second fluid passage upon movement of said male coupler member from the fixed connection condition.

13. The fluid coupler according to claim 12, further comprising:
   a first locking member that is
   (i) engageable with said first valve and said male coupler member so as to prevent said first valve and said male coupler member from moving relative to each other in a direction parallel to said axis, and
   (ii) radially displaceable outwardly by said male coupler member, upon movement of said male coupler member from the fixed connection position in the direction opposite to the direction of insertion of said male coupler member into said male coupler receiving hole, so as to engage with said first valve and said female coupler member after said first valve and said male coupler member have moved a predetermined distance from the fixed connection position in the direction opposite to the direction of insertion of said male coupler member into said male coupler receiving hole, such that said first valve is prevented from continuing to move in the direction opposite to the direction of insertion of said male coupler member into said male coupler receiving hole and said male coupler member is allowed to continue to move in the direction opposite to the direction of insertion of said male coupler member into said male coupler receiving hole.

14. The fluid coupler according to claim 13, further comprising:
   a locking member retaining member for engaging said first locking member, such that after said first locking member has been displaced radially outwardly by said male coupler member said locking member retaining member prevents said first locking member from moving radially inwardly.

15. The fluid coupler according to claim 14, further comprising:
   a spring member for urging said locking member retaining member in the direction opposite to the direction of insertion of said male coupler member into said male coupler receiving hole,
   wherein said locking member retaining member is movable in the direction opposite to the direction of insertion of said male coupler member into said male coupler receiving hole such that when said first locking member is engaged with both said first valve and said male coupler member said locking member retaining member urges said male coupler member and said first valve in the direction opposite to the direction of insertion of said male coupler member into said male coupler receiving hole.

16. The fluid coupler according to claim 15, wherein said locking member retaining member is positioned between said first valve and said male coupler member when said male coupler member is inserted within said male coupler receiving hole, and is movable relative to said first valve and said male coupler member in a direction parallel to said axis, said fluid coupler further comprising:
   a second locking member engageable with said locking member retaining member and said male coupler member to enable said locking member retaining member and said male coupler member to move together in a direction parallel to said axis, and also engageable with said locking member retaining member and said first valve to enable said male coupler member to move relative to said locking member retaining member, such that
   (i) with said second locking member engaged with said locking member retaining member and said male coupler member, upon movement of said male coupler member from the fixed connection position in the direction opposite to the direction of insertion of said male coupler member into said male coupler receiving hole said locking member retaining member is moved together with said male coupler member and brought into a position, radially inwardly of said first locking member, at which said locking member retaining member engages said first locking member and prevents said first locking member from moving radially inwardly after said male coupler member has passed said first locking member and displaced said first locking member radially outwardly, and
   (ii) when said locking member retaining member is brought into the position radially inwardly of said first locking member, said second locking member is permitted to be displaced radially outwardly by said male coupler member, upon movement of said male coupler member in the direction opposite to the direction of insertion of said male coupler member into said male coupler receiving hole, so as to enable said second locking member to be engaged by both said locking member support member and said first valve to thereby prevent said locking member retaining member from moving together with said male coupler member while said male coupler member continues to move in the direction opposite to the direction of insertion of said male coupler member into said male coupler receiving hole.

* * * * *